Figure 1:
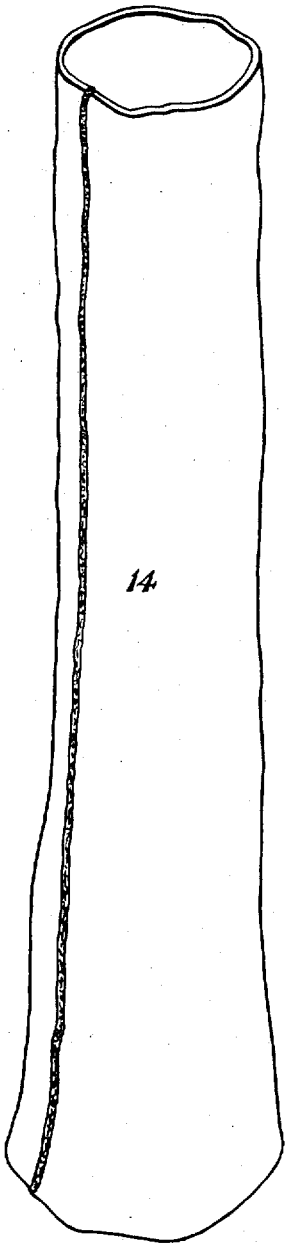

C. A. FRAHM ET AL

Dec. 8, 1931. SHEET METAL SHAFT AND METHOD OF MAKING SAME Re. 18,272

Original Filed Jan. 25, 1928 7 Sheets-Sheet 1

Inventors

Carl A. Frahm

E. W. Riemenschneider

By Frease and Bond Attorneys

C. A. FRAHM ET AL

Dec. 8, 1931. SHEET METAL SHAFT AND METHOD OF MAKING SAME Re. 18,272

Original Filed Jan. 25, 1928 7 Sheets-Sheet 2

Inventors

Carl A. Frahm

E. W. Riemenschneider

By Fraser and Bond

Attorneys

C. A. FRAHM ET AL

Dec. 8, 1931. SHEET METAL SHAFT AND METHOD OF MAKING SAME Re. 18,272

Original Filed Jan. 25, 1928 7 Sheets-Sheet 3

Inventors

*Carl A. Frahm*

*E. W. Riemenschneider*

By *Fraser and Bond* Attorneys

C. A. FRAHM ET AL

Dec. 8, 1931. SHEET METAL SHAFT AND METHOD OF MAKING SAME Re. 18,272

Original Filed Jan. 25, 1928 7 Sheets-Sheet 4

Inventors

Carl A. Frahm

E. W. Riemenschneider

By Frease and Bond Attorneys

C. A. FRAHM ET AL

SHEET METAL SHAFT AND METHOD OF MAKING SAME

Dec. 8, 1931. Re. 18,272

Original Filed Jan. 25, 1928 7 Sheets-Sheet 5

Inventors

*Carl A. Frahm*

*E. W. Riemenschneider*

By *Freese and Bond* Attorneys

C. A. FRAHM ET AL

Dec. 8, 1931. SHEET METAL SHAFT AND METHOD OF MAKING SAME Re. 18,272

Original Filed Jan. 25, 1928 7 Sheets-Sheet 6

Inventors

Carl A. Frahm

E. W. Riemenschneider

By Fraser and Bond

Attorneys

C. A. FRAHM ET AL

SHEET METAL SHAFT AND METHOD OF MAKING SAME

Dec. 8, 1931. Re. 18,272

Original Filed Jan. 25, 1928 7 Sheets-Sheet 7

Inventors

Carl A. Frahm

E. W. Reimenschneider

By Fraser and Bond Attorneys

Reissued Dec. 8, 1931

Re. 18,272

UNITED STATES PATENT OFFICE

CARL A. FRAHM AND EDMUND W. RIEMENSCHNEIDER, OF CANTON, OHIO, ASSIGNORS TO THE UNION METAL MANUFACTURING COMPANY, OF CANTON, OHIO, A CORPORATION OF OHIO

SHEET METAL SHAFT AND METHOD OF MAKING SAME

Original No. 1,777,080, dated September 30, 1930, Serial No. 249,353, filed January 25, 1928. Application for reissue filed July 21, 1931. Serial No. 552,274.

The invention relates to hollow shafts made of metal rolled into sheets, strips or plates, and adapted for use in columns and as pillars, posts, poles, standards and the like; including shafts of this character which are corrugated or fluted to increase the strength of the same, as shown in the Numan Patents No. 838,571 of December 18, 1906, and No. 888,114 of May 19, 1908.

The object of the present improvement is to increase the strength of shafts of this character when made of rolled metal sheets, strips or plates, hereinafter referred to collectively as sheet metal; and the general object of the present improvement is to produce a sheet metal shaft having a greater strength against compressing, bending, flexing and tortional strains than has heretofore been attained, the shaft being especially adapted for use as telegraph, telephone, transmission or trolley poles, having greater strength and being lighter in weight and neater in appearance than poles at present in use for such purposes.

In the manufacture of fluted sheet metal shafts, the metal has been merely bent laterally over the ribs of a mandrel to form the fillets and flutes in the shaft, without changing the thickness of the sheet metal at any point, and without materially increasing the elastic limit of the metal beyond the normal strength of the same in the sheet from which the shaft is made.

Although sheet metal shafts made in this manner are strengthened to a certain extent by corrugations or flutes formed by bending the metal, it has been found in actual practice and by tests, that when subjected to strains or blows, such shafts will invariably bend or buckle inward more readily than similar shafts having sharp edged, as cold rolled, fillets between the flutes; and by a mere bending of the sheet to form flutes or fillets, it has been commercially impossible to uniformly obtain an architecturally correct outline in the shaft, or to produce the sharp corners or edges in the fillets which is essential in Doric and in Ionic or Corinthian columns; these detrimental characters becoming more apparent and exaggerated as the thickness of sheet used is increased.

Beginning with the formation of a tubular shaft, the present invention includes a compression, as by cold rolling, of the sheet or plate metal wall of the shaft so as to change the cross sectional shape of the shaft, as by forming flutes and fillets, and also to change the molecular arrangement of the metal and increase the elastic limit thereof.

The formation of flutes and fillets by a swaging and flowing compression of the metal, as by cold rolling, which works and displaces the metal in certain places, also forms sharp edges in the fillets and changes the molecular arrangement of the metal; so as to increase the strength of the fillets not only by an increased thickness of the metal, but by an increase in the elastic limit thereof, due to the working of the metal.

Moreover, the compressing or cold rolling operation not only forms the flutes and the fillets, but also straightens any longitudinal camber or bends and any circular imperfections there may be in the contour of the tubular shaft, and sets the molecular arrangement of the metal in the same so that a finished shaft may be split longitudinally and each half will hold its shape for matching and being readily joined to the other half, which cannot be done by a shaft formed merely by bending operations.

Figure 2:
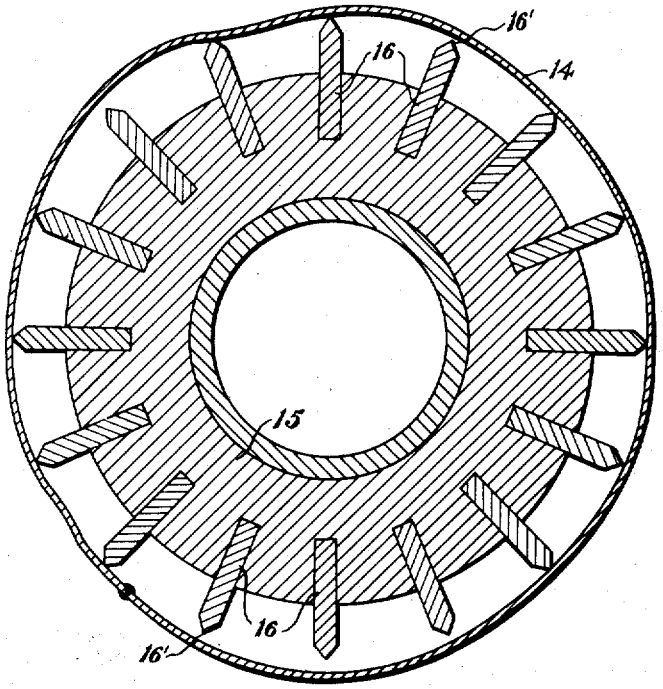
Figure 3:
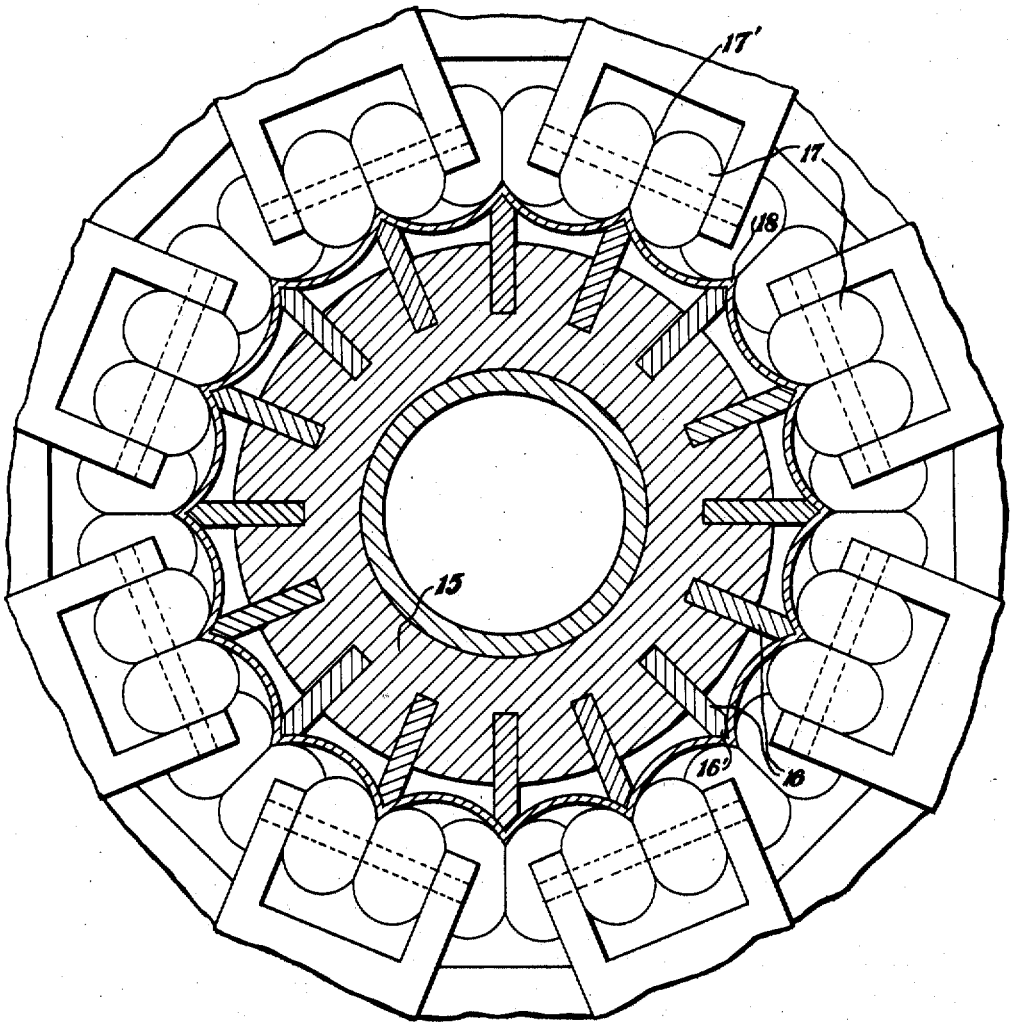
Figure 4:
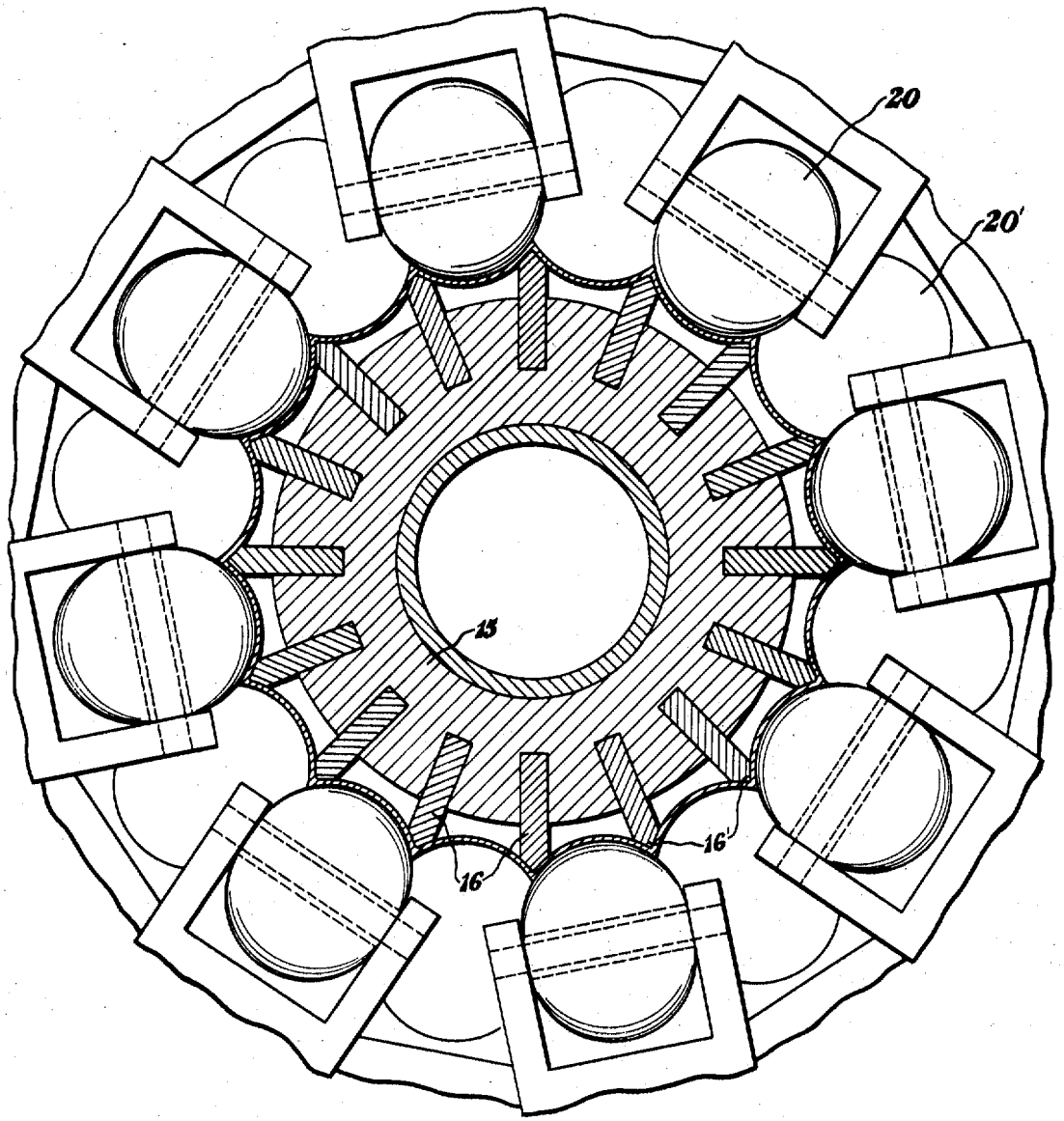
Figure 5:
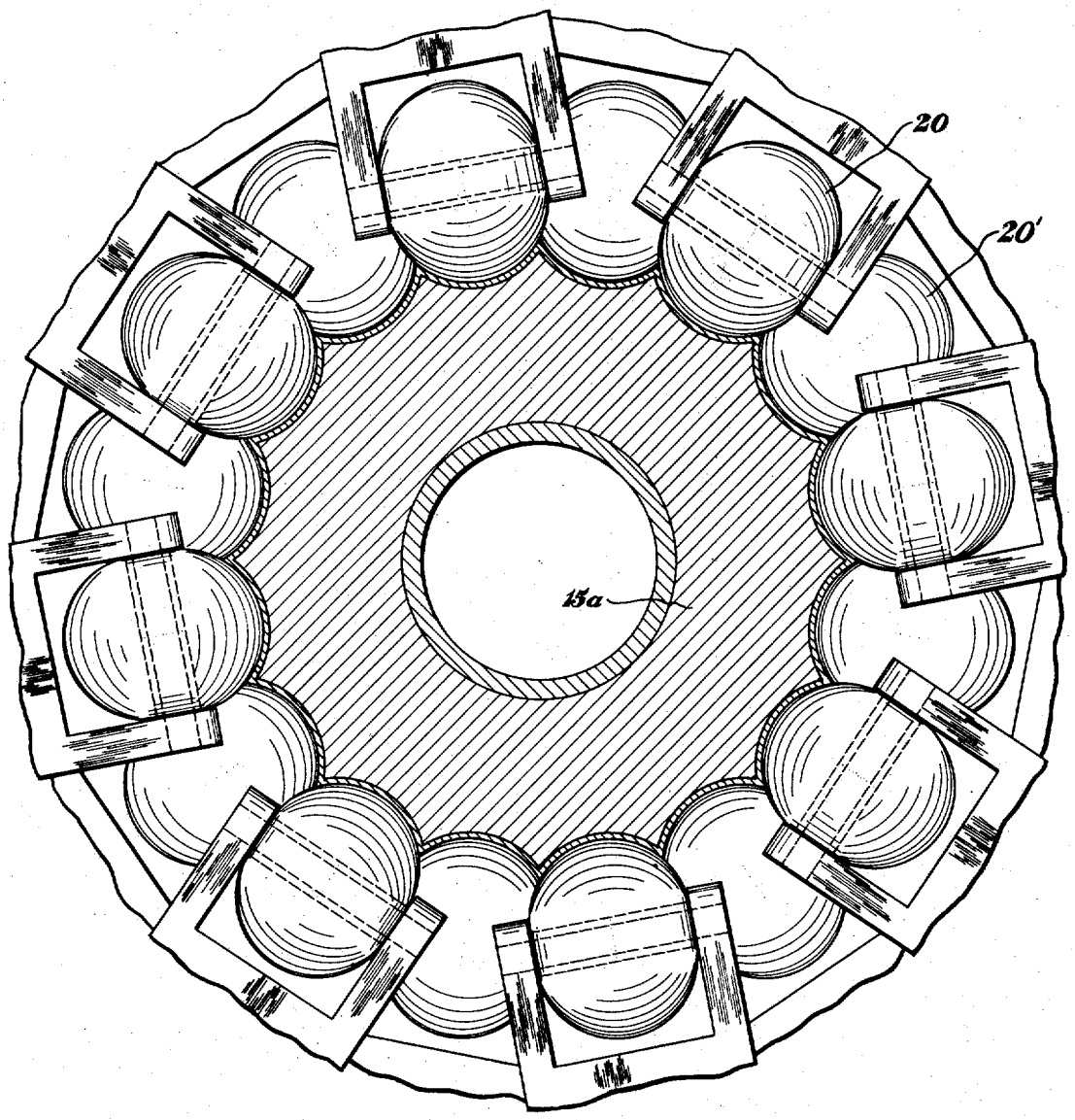
Figure 6:
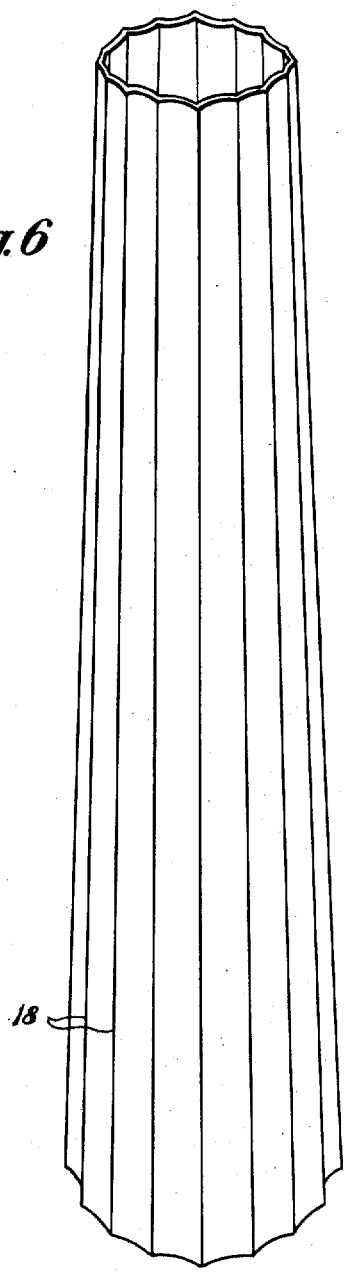
Figure 7:
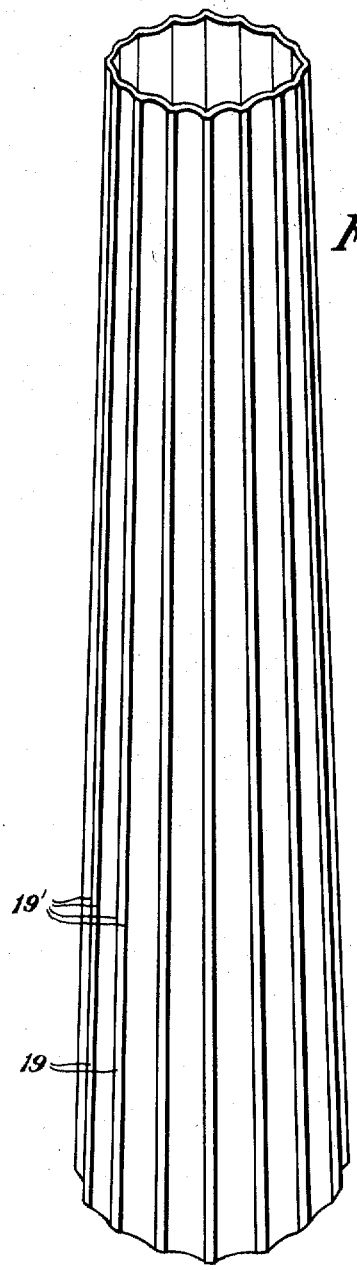
Figure 8:
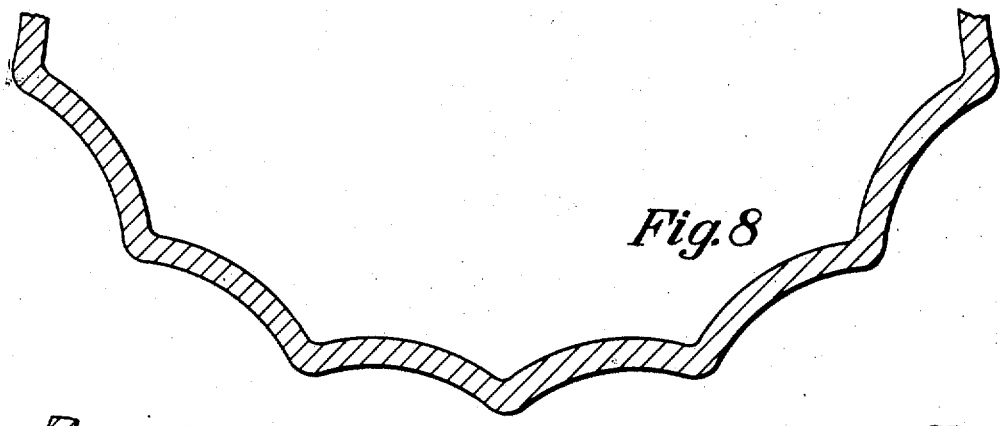
Figure 9:
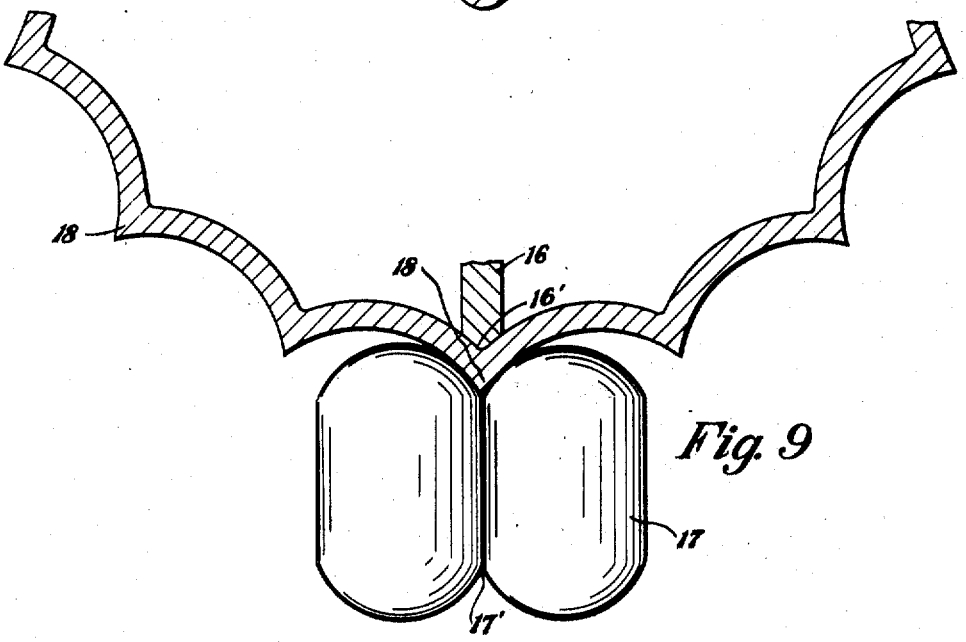
Figure 14:
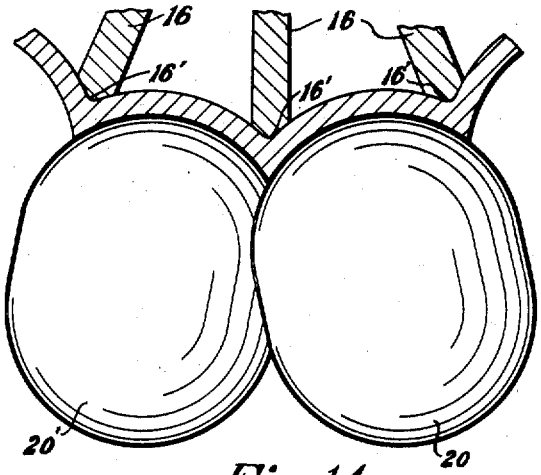
Figure 10:
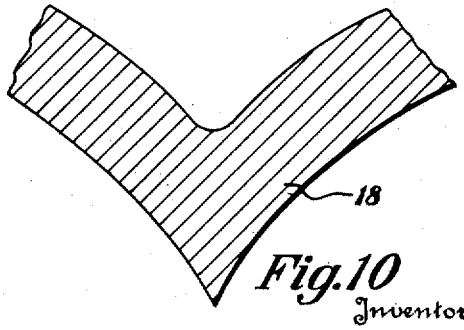
Figure 11:
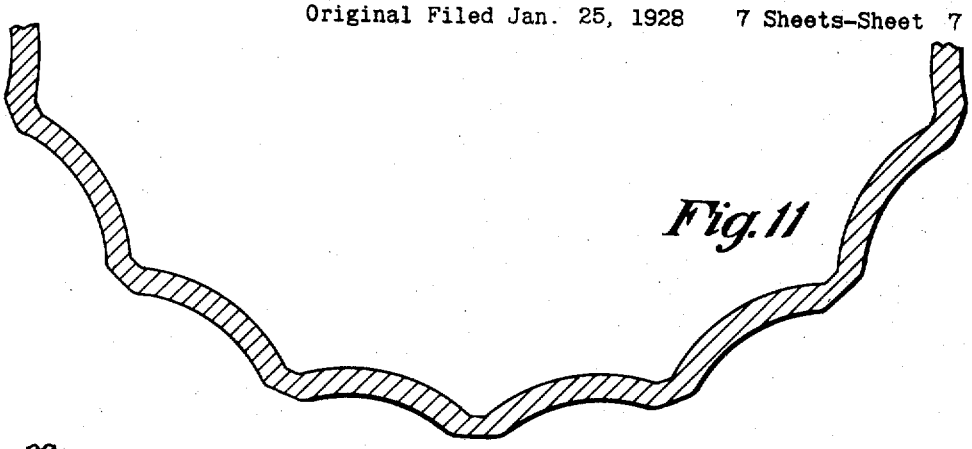
Figure 12:
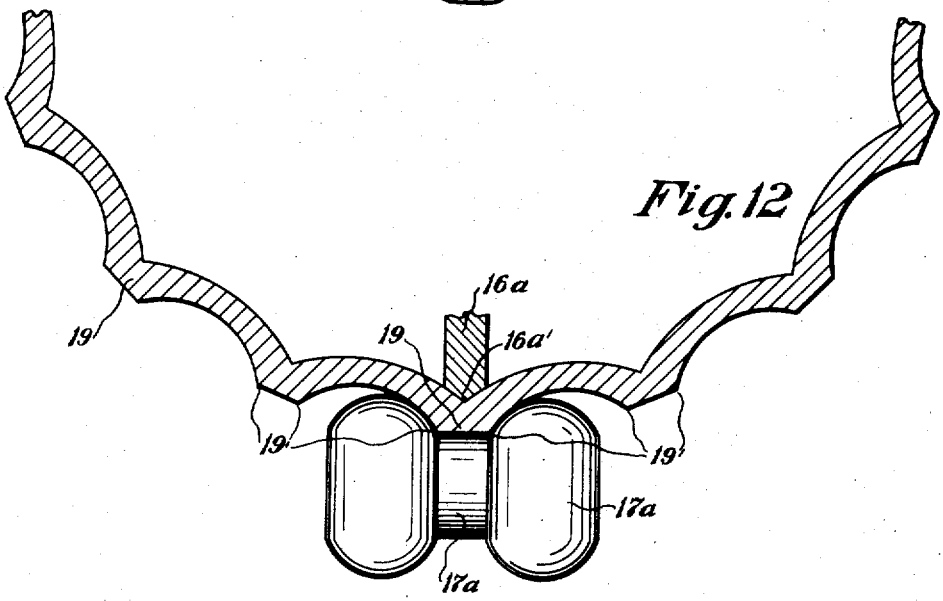
Figure 13:
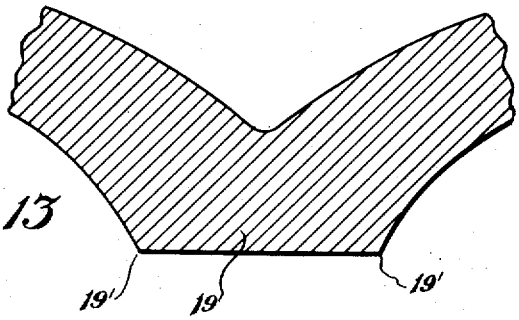

A fluting machine of the type set forth in the Frahm Patent No. 1,605,628 of November 2, 1926, when properly modified and operated in the manner herein described, may be used in carrying out the improved method of making the improved shaft, as illustrated in the accompanying drawings, forming part hereof, in which Figure 1 is a perspective view of a portion of a tapered tubular shaft from which a fluted shaft may be made;

Fig. 2, a cross section through a mandrel, showing the tubular shaft positioned thereon for a cold rolling and fluting operation;

Fig. 3, a transverse section through the mandrel and shaft, showing one method of forming the fillets between the flutes by one kind of rolls;

Fig. 4, a similar view showing one manner of finishing the formation of flutes by another kind of rolls;

Fig. 5, a similar view through a modified mandrel, showing a method of forming both the flutes and the fillets by the same kind of rolls;

Fig. 6, a perspective view of a fluted shaft of the Doric order, embodying the invention;

Fig. 7, a similar view of an Ionic or Corinthian shaft;

Fig. 8, an enlarged transverse section through a portion of a fluted tubular shaft of the Doric order, made by the ordinary bending method;

Fig. 9, a similar view illustrating the improved method of making fillets in a shaft of the Doric type, by cold rolling and extruding the metal for increasing the thickness at the angles and sharpening the same;

Fig. 10, a fragmentary enlarged section, showing details of an improved fillet of the Doric type;

Fig. 11, a similar view of a fluted shaft of the Ionic or Corinthian order, made by the ordinary bending method;

Fig. 12, a similar view illustrating the improved method of making fillets in a shaft of the Ionic or Corinthian type, by cold rolling and extruding the metal for increasing the thickness at the angles and sharpening the same;

Fig. 13, a fragmentary enlarged section showing details of the improved fillet of the Ionic or Corinthian type; and Fig. 14, an enlarged fragmentary view of the apparatus shown in Fig. 4.

Similar numerals refer to similar parts throughout the drawings.

When a tapered tubular shaft 14 is used, the same may be formed from a longitudinally tapered blank or strip of sheet or plate metal by bending rolls and forming dies and edge welding means by which the blank is laterally curved to bring its side edges into contact, and the contacting edges are joined together as by welding, as set forth in Riemenschneider's Patents No. 1,765,384 of June 24, 1930, for Tubular column forming machine, and No. 1,746,281 of February 11, 1930, for Tubular poles and forming apparatus therefor.

In any event, the tubular shaft is preferably made by curving the strip laterally, and abutting and welding its edges together by a yielding pressure, as set forth in said latter Patent No. 1,746,281; and when so formed, the diameter of the tubular shaft may be and preferably is slightly larger than the diameter of the fillet forming ribs on the fluting mandrel, so as to give a circumferential fullness to be taken up and trued by the cold rolling and flute forming operations, as shown in Fig. 2.

When the fluting operations are performed by a machine of the type shown in said Frahm Patent No. 1,605,828, the mandrel body 15 is provided with a series of equally spaced steel die bars or ribs 16 or 16*a*, extending radially from the periphery of the body, and each rib may be provided with a substantially V-shaped outer edge 16′ or 16*a*′ for contact with the inner face of the tubular shaft 14, as shown in Figs. 9 and 12.

The mandrel with the tubular shaft mounted thereon as shown in Fig. 2, is moved one or more times endwise between a set or series of radially yielding steel die rolls as 17 or 17*a*, shaped to form the desired outline of the fillets to be formed and arranged to bear upon the shaft at the points opposite corresponding die bars 16 or 16*a*, as shown in Figs. 9 and 12.

There may be, and usually are required to be, two sets or series of such fillet forming die rolls arranged to operate upon alternate fillets, because there is not room enough to place all the rolls in a single stand; and these rolls may be and preferably are provided with sharp angle V-shaped annular grooves 17′ to produce the sharp edge fillets 18, as shown in Fig. 9, or may be provided with the flat bottom annular grooves 17*a*′ to produce the flat face fillets 19 with sharp edges 19′, as shown in Fig. 12.

Sufficient pressure is applied to the fillet forming rolls to displace or swage the metal in the longitudinally extending zones defined by the fillets as the same passes through the rolls, and to cause the metal to flow and extrude into the groovés of the rolls, to increase the thickness of the metal at that place and also form a sharp edge or sharp edges in the fillets.

The same operation cold rolls and swages the metal in the wall of the shaft in and adjacent to the fillets, and by changing the molecular arrangement of the same, increases its elastic limit and thereby increases the strength of the fillets as well as of the column.

The same cold rolling operation also elongates the metal in the fillets and increases the length of the shaft to an extent which has been found in practice to be from one-half of one per cent to four and a half per cent longer than the original tubular shaft.

During the described operations upon the fillets, the sheet metal between them is partially formed into flutes, as shown in Figs. 3 and 9, and the metal therein being relatively softer than the cold rolled fillets, and being necessarily extended longitudinally by stretching to the extent of the increased length of the shaft, may also be stretched somewhat laterally in the formation of the longitudinally extending zones defined by the flutes so as to slightly increase its elastic limit.

Whereupon the mandrel with the fillet formed shaft thereon is passed one or more times between another set or series of radially yielding rolls 20 and 20′, shaped to form the desired concavity of the flutes and bearing upon the shaft at and between adjacent fillet forming die bars or ribs 16.

The action of these rolls not only stretches and shapes the flutes, but completes the action of the fillet forming rolls and sets the molecular arrangement of the metal and relieves the same of flexing strains, so that the shaft will hold its shape thus given, even though it may be severed longitudinally into two lateral halves.

Moreover, the same operations serve to straighten the tubular shaft longitudinally and to true its shape circumferentially, so that when the fluted shaft is removed longitudinally from the mandrel, it is a correctly formed and truly shaped straight shaft with sharp edge fillets of the type given to them by the fillet forming rolls.

The operation of the flute forming rolls not only takes up the circumferential fullness of the shaft, but so takes up the metal, between the ribs of the mandrel, that the shaft fits so tightly upon the mandrel that it is difficult, if not impossible, to remove it therefrom. This, however, may be accomplished by giving the shaft one or more endwise or longitudinal passes through the fillet forming rolls, after the operation above described, which not only gives the fillets a further cold rolling but also loosens the shaft from the mandrel and permits it to be removed endwise therefrom.

Or, the operation may be modified from that above described, by first passing the shaft through the flute forming rolls, which takes up the circumferential fullness of the metal and fits the shaft tightly upon the ribs of the mandrel, and then passing the shaft through the fillet forming rolls, the operation of which not only cold rolls the fillets but also loosens the shaft from the mandrel and permits it to be removed endwise therefrom.

Modified means for fluting a tubular shaft, by substantially the same method, are illustrated in Fig. 5, wherein the contour of the flutes and fillets is formed directly in the periphery of the body 15*a* of the mandrel, in connection with which mandrel one or more series of the same kind of flute forming rolls 20 and 20′ may be used which are pressed against the mandrel with sufficient force to cold roll both the fillets and the flutes, and to swage or displace the metal in the fillets and extrude the same to increase the thickness thereof and sharpen the edges thereon, substantially as described above.

The same operations also serve to straighten the shaft longitudinally and true it circumferentially, and to set and fix the molecular arrangement of the metal, so that the shaft will retain the shape given to it by the operation of the forming dies upon the mandrel; swaging, forming or changing the molecular arrangement of the metal, to make possible the removal of the shaft from the mandrel.

It has been found by actual tests that sheet metal shafts formed and fluted by the improved method described herein, have a greater strength and a greater limit of elasticity than any other known form of tubular shafts of considerably greater weight; and at the same time the shaft is formed with clean-cut sharp lines and with sharp edges on the fillets, thereby producing a shaft of architecturally correct outlines and appearance.

It has also been found by actual tests that the increased thickness of the metal in the fillets, the extrusion of the metal in the sharp angles thereof, and the increased elastic limit of the metal in the shaft, so greatly increases the ultimate strength of the improved shafts, that they will bulge outward at a point of rupture and after rupture will stand a considerable loading, instead of bulging inward under strain or impact at a point of rupture in the manner common to all other known types of tubular shafts.

It has not been found possible, heretofore, to make fluted shafts from the thicker gauges of rolled metal, from 11 gauge and thicker, which are known to the trade as plate metal; because comparatively narrow fillets between relatively wide flutes, cannot be formed merely by a bending operation, upon a small enough radius to give any substantial semblance to an architectural fluted column.

In addition to that inhibition, the inability to make a fluted shaft from plate metal, solely by a bending operation, is because the metal is so thick that a mere bending stretches and reduces the thickness and may even rupture the metal itself, around the periphery of the fillet, so that, unless the same is accompanied by a swinging compression operation, such as is described herein, the shaft is weakened at the very place it should be strengthened, for use as a column or pole.

It is for these reasons that the swaging compression method of making tubular shafts, described and claimed herein, has rendered it possible, for the first time, to make from plate metal, the tapered, fluted, tubular pole, which is described and claimed in our application, filed July 16, 1931, Serial No. 551,270 for the reissue of our Letters Patent No. 1,789,972, as a new article of manufacture.

It is not intended to limit the broad idea of cold rolling a tubular shaft made of sheet metal to increase the strength thereof by increasing the elastic limit of the metal, to the formation of a fluted shaft, as set forth herein by way of illustration; it being evident that a cold rolling of an imperfectly shaped tubular shaft will serve not only to straighten the same longitudinally and true the same circumferentially by changing the molecular arrangement of the metal, but will also serve to strengthen the shaft by the resulting increase in the elastic limit of the metal.

Nor is it intended to limit the broad idea of compressing the metal in the wall of the shaft between metal dies with sufficient force to shape the fillets alone, or both the fillets and the flutes, and to swage and displace the metal in the fillets to cause it to flow and extrude a predetermined thickness and shape; to the cold rolling operations which are described herein for illustrating the preferred method of applying such pressure.

Nor is it intended to limit the scope of the invention to the tapered tubular shafts described herein by way of illustration, for obviously the broad idea of the improved method may be used as well for the production of tubular shafts without a taper, and to shafts having an entasis, by so shaping the mandrel.

In the claims appended hereto, the expression "sheet metal" is intended to include strips and plates as well as sheets of metal; the term "shaft" is intended to include pillars, posts, poles, standards, columns and the like; and the expression "strip metal" is intended to include sheet strips as well as plate strips, however they may be made or produced.

We claim:

1. The method of making a tapered tubular shaft which includes laterally curving a longitudinally tapered sheet metal blank to bring its edges into contact, joining the contacting edges as by welding, and then working the metal to change and set its molecular arrangement, to increase its elastic limit, to remove flexing strains and to strengthen and true the tapered shaft, as by cold rolling.

2. The method of making a tubular shaft which includes laterally curving a sheet metal blank to bring its edges into contact, joining the contacting edges as by welding, and then bending and working the metal between opposing interior and exterior dies to produce an angular cross sectional shape and to extrude the metal and thicken the wall of the shaft in predetermined places.

3. The method of fluting a tubular shaft which includes forming flutes and fillets by working the metal so as to change and set the molecular arrangement, increase the elastic limit and remove flexing strains in the metal in the shaft, as by a swaging compression of the wall of the shaft between metal dies.

4. The method of fluting a tubular shaft which includes forming flutes and fillets by working the metal so as to change and set the molecular arrangement, increase the elastic limit and remove flexing strains in the metal of the shaft, as by cold rolling the wall of the shaft between metal dies.

5. The method of fluting a tubular shaft which includes forming flutes and fillets by working the metal so as to change and set the molecular arrangement, increase the elastic limit and remove flexing strains in the metal of the shaft in predetermined places, as by a swaging compression of the wall of the shaft between metal dies.

6. The method of fluting a tubular shaft, which includes forming flutes and fillets by working the metal so as to change and set the molecular arrangement, increase the elastic limit and remove flexing strains in the metal of the shaft in predetermined places, as by cold rolling the wall of the shaft between metal dies.

7. The method of fluting a tubular shaft which includes forming flutes and fillets, and extruding the metal in the shaft and increasing the thickness thereof in predetermined places, as by a swaging compression of the wall of the shaft between metal dies.

8. The method of fluting a tubular shaft which includes forming flutes and fillets, and extruding the metal in the shaft and increasing the thickness thereof in predetermined places, as by cold rolling the wall of the shaft between metal dies.

9. The method of fluting a tubular shaft which includes forming flutes and fillets, and extruding the metal in the shaft and changing and setting the molecular arrangement and removing flexing strains therein in predetermined places, as by a swaging compression of the wall of the shaft between metal dies.

10. The method of fluting a tubular shaft which includes forming flutes and fillets, and extruding the metal in the shaft and changing and setting the molecular arrangement and removing flexing strains therein in predetermined places as by cold rolling the wall of the shaft between metal dies.

11. The method of fluting a tubular shaft which includes forming flutes and fillets, and extruding the metal in the fillets and increasing the thickness thereof, as by a swaging compression of the wall of the shaft between metal dies.

12. The method of fluting a tubular shaft which includes forming flutes and fillets, and extruding the metal in the fillets and increasing the thickness thereof, as by cold rolling the wall of the shaft between metal dies.

13. The method of fluting a tubular shaft which includes forming flutes and fillets, and extruding the metal in the fillets and changing and setting the molecular arrangement thereof and removing flexing strains therein, as by a swaging compression of the wall of the shaft between metal dies.

14. The method of fluting a tubular shaft which includes forming flutes and fillets, and extruding the metal in the fillets and changing and setting the molecular arrangement thereof and removing flexing strains therein, as by cold rolling the wall of the shaft between metal dies.

15. The method of fluting a tubular shaft which includes forming flutes and fillets, and extruding the metal in the fillets and forming sharp edges thereon, as by a swaging compression of the wall of the shaft between metal dies.

16. The method of fluting a tubular shaft which includes forming flutes and fillets, and extruding the metal in the fillets and forming sharp edges thereon, as by cold rolling the wall of the shaft between metal dies.

17. The method of fluting a tubular shaft which includes forming flutes and fillets by working the metal so as to increase the elastic limit of the metal in the shaft as by cold rolling the fillets and stretching the flutes.

18. The method of fluting a tubular shaft which includes forming flutes and fillets by working the metal so as to change and set the molecular arrangement of the metal in the shaft and removing flexing strains therein, as by cold rolling the fillets and stretching the flutes.

19. The method of fluting a tubular shaft upon a ribbed mandrel, which consists in pressing the shaft against the ribs to form fillets, pressing the shaft between the ribs to form flutes, and pressing the fillets against the ribs to loosen the shaft from the mandrel.

20. The method of fluting a tubular shaft upon a ribbed mandrel which consists in pressing the shaft between the ribs to form flutes, and then pressing the shaft against the ribs to form fillets on the shaft and to loosen the shaft from the mandrel.

21. The method of fluting a tubular shaft upon a ribbed mandrel, which consists in forming flutes and fillets by cold rolling the fillets and stretching the flutes and then further cold rolling the fillets to loosen the shaft from the mandrel.

22. The method of fluting a plain sheet metal tubular shaft which includes forming flutes and fillets by compressing and extruding the metal in the wall of the shaft between metal dies to form the fillets.

23. The method of fluting a plain sheet metal tubular shaft which includes forming flutes and fillets, and changing and setting the molecular arrangement and extruding the metal in the fillets, by a swaging compression of the wall of the shaft between metal dies, which changes and sets the molecular arrangement and extrudes the metal in the fillets.

24. The method of forming flutes and fillets in sheet metal, which includes working the metal as by stretching the flutes and compressing the fillets so as to change and set the molecular arrangement thereof.

25. The method of forming flutes and fillets in sheet metal, which includes working the metal to change the thickness thereof in predetermined longitudinally extending zones by stretching the metal in some zones and swaging the metal in other zones as by a swaging compression of the metal in certain zones.

26. The method of forming flutes and fillets in sheet metal, which includes working the metal to change the thickness thereof in predetermined longitudinally extending zones by a swaging compression of the metal in certain zones.

27. The method of forming flutes and fillets in sheet metal, which includes working the metal in predetermined longitudinally extending zones by stretching the metal in some zones and swaging the metal in other zones, as by a swaging compression thereof in certain zones.

28. The method of forming flutes and fillets in sheet metal, which includes working the metal in predetermined longitudinally extending zones by a swaging compression thereof between metal dies in certain zones.

29. The method of making a tube from strip metal, which includes curving the strip laterally and abutting and welding its side edges together by a yielding pressure to form a tube, and then working the metal as by cold rolling the tube on a mandrel to straighten and true the same.

30. The method of making a tube from strip metal, which includes curving the strip laterally and abutting and welding its side edges together by a yielding pressure to form an imperfectly shaped tube, and then working the metal as by cold rolling the imperfectly shaped tube on a mandrel to form a straight and true tube.

31. The method of making a tube from strip metal, which includes curving the strip laterally and abutting and welding its side edges together by a yielding pressure to form an imperfectly shaped tube, and then working the metal as by cold rolling the imperfectly shaped tube on a cylindric mandrel to form a straight and true cylindric tube.

32. The method of making a tube from strip metal, which includes curving the strip laterally and abutting and welding its side edges together by a yielding pressure to form an imperfectly shaped tube, and then working the metal as by cold rolling the imperfectly shaped tube on a tapered mandrel to form a straight and true tapered tube.

CARL A. FRAHM.
EDMUND W. RIEMENSCHNEIDER.